No. 748,643. PATENTED JAN. 5, 1904.
W. P. NORTHCOTT & E. E. FLORA.
MACHINE FOR PRINTING THE BACKS OF BOOKS.
APPLICATION FILED MAR. 14, 1902.
NO MODEL. 6 SHEETS—SHEET 3.

Witnesses:

Inventors
William P. Northcott and
Ellsworth E. Flora.
By Thomas F. Sheridan,
Att'y No. 748,643. PATENTED JAN. 5, 1904.
W. P. NORTHCOTT & E. E. FLORA.
MACHINE FOR PRINTING THE BACKS OF BOOKS.
APPLICATION FILED MAR. 14, 1902.
NO MODEL. 6 SHEETS—SHEET 5.

Witnesses:

Inventors
William P. Northcott
Ellsworth E. Flora,
By Thomas F. Sheridan,
Att'y

No. 748,643.

Patented January 5, 1904.

UNITED STATES PATENT OFFICE.

WILLIAM P. NORTHCOTT AND ELLSWORTH E. FLORA, OF CHICAGO, ILLINOIS; SAID FLORA ASSIGNOR TO SAID NORTHCOTT.

MACHINE FOR PRINTING THE BACKS OF BOOKS.

SPECIFICATION forming part of Letters Patent No. 748,643, dated January 5, 1904.

Application filed March 14, 1902. Serial No. 98,196. (No model.)

*To all whom it may concern:*

Be it known that we, WILLIAM P. NORTHCOTT and ELLSWORTH E. FLORA, citizens of the United States, residing at Chicago, in the county of Cook and State of Illinois, have invented certain new and useful Improvements in Machines for Printing the Backs of Books, of which the following is a specification.

This invention relates to that class of machines which is constructed and arranged to hold books, such as ledgers and large account-books, in position, and particularly to the means by which printing of desired character may be made on such books, all of which will more fully hereinafter appear.

The principal object of the invention is to provide a simple, economical, and efficient machine for printing on the backs of books.

The invention consists principally in the combination of means for holding a book in position, a form for holding type of desired characters, and means for guiding such form across the back of the book while the printing is being done.

The invention consists, further, in the combination of a book-holding platform, means for clamping the book in position, track-blocks arranged adjacent to the edge of such book, and a form bearing type of the desired characters arranged to contact and be guided by such track-blocks while it is passing over and around the back of the books during the printing operation.

The invention consists, further and finally, in the features, combinations, and details of construction hereinafter described and claimed.

In the accompanying drawings.

In the art to which this invention relates it is well known that it is very difficult to do the printing on the backs of large account-books, such as ledgers and the like, in that generally such printing has to be done by hand or one line at a time and after the binding operation is completed.

This invention, therefore, has for its principal object the providing of a simple, economical, and efficient machine for the holding of large books and doing the printing thereon—several lines at a time, if necessary—as efficiently as possible, all of which will more fully hereinafter appear.

In constructing a machine in accordance with these improvements we make a main frame portion composed of a base-piece $a$, a standard $b$, and an upper portion $c$, to which is secured most of the operative mechanisms.

Figure 1:
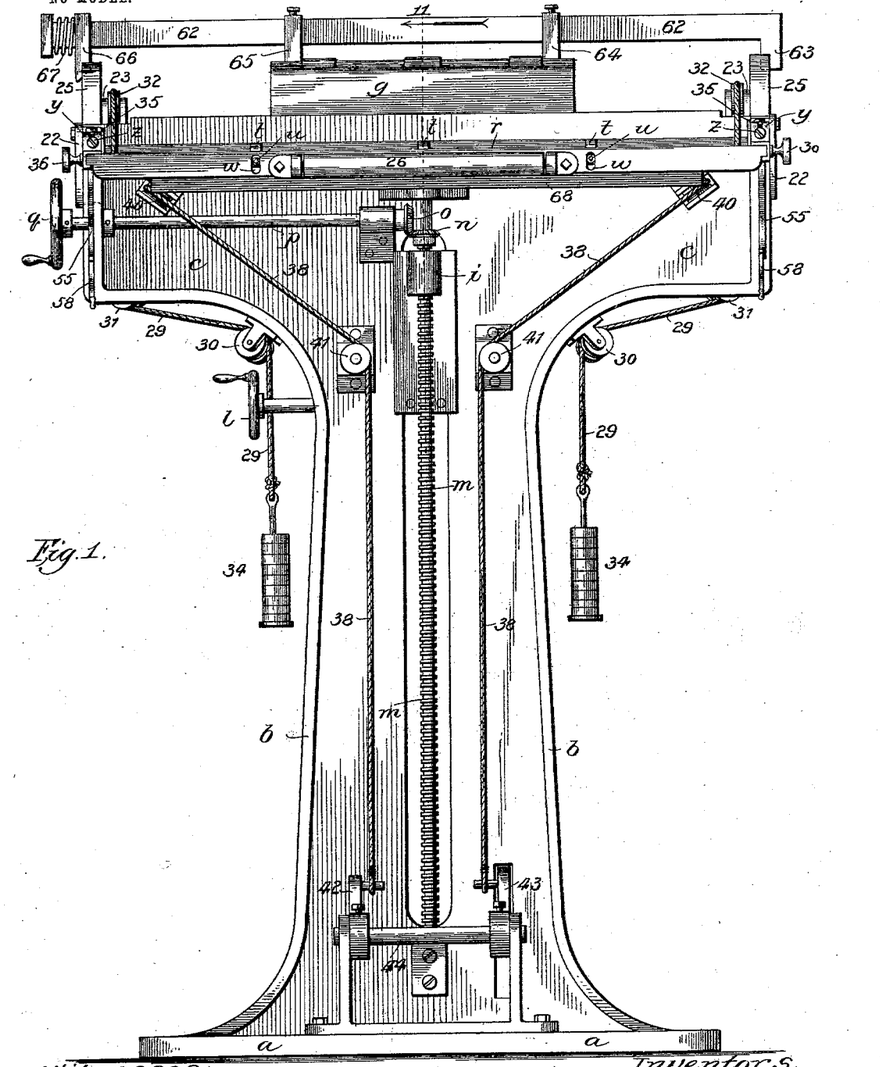
Figure 1 is an elevation of a machine constructed in accordance with these improvements.
Figure 2:
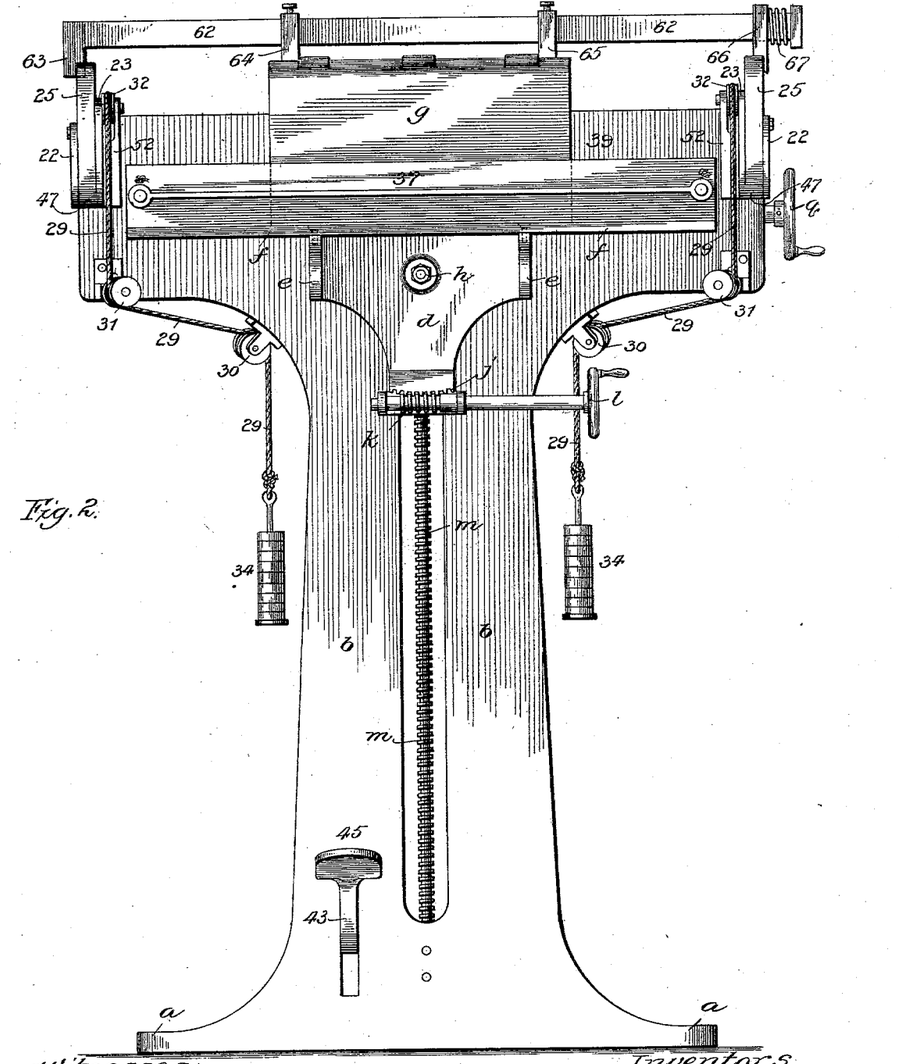
Fig. 2, a front elevation of the same.
Figure 3:
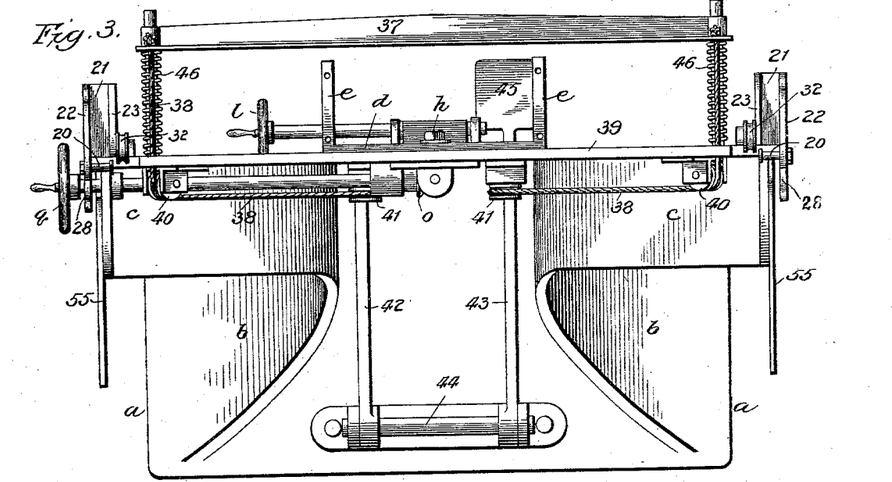
Fig. 3, a plan view of the machine looking down upon it with the form and chase-block and the book-table removed, so as to show the operative mechanisms more clearly.
Figures 11, 12, 13, 14:
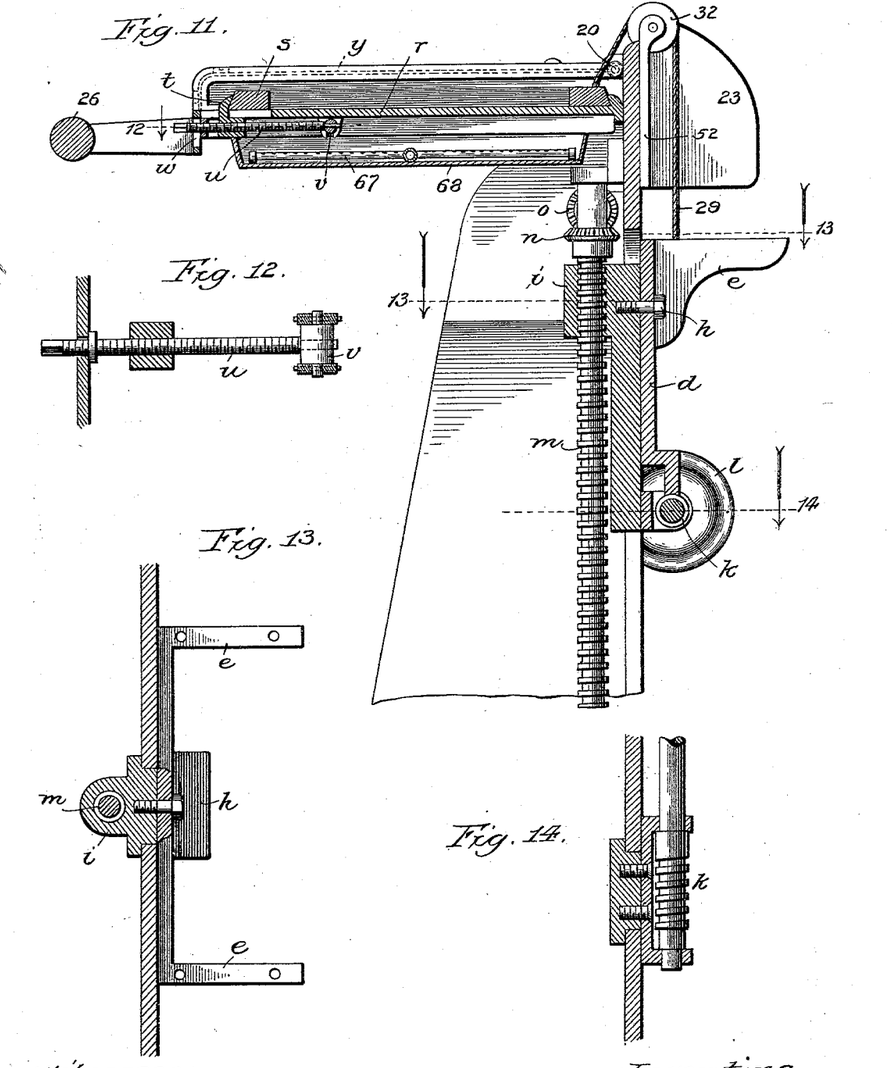
Fig. 11, an enlarged sectional elevation of a portion of the machine, taken on line 11 of Fig. 1.
Fig. 12, a sectional detail taken on line 12 of Fig. 11.
Fig. 13, a sectional plan view of a portion of the machine, taken on the irregular line 13 of Fig. 11.
Fig. 14, a sectional detail taken on line 14 of Fig. 11.

It is first desirable to provide means by which a book may be simply and efficiently held in position. To accomplish this result, we make a book-supporting platform consisting of a vertically-arranged plate $d$, provided with two upwardly-extending brackets $e$. (Shown particularly in Figs. 3 and 11.) To the top of these brackets is secured, as shown in Figs. 2 and 3, any desired size of supporting board or shelf $f$. Upon this shelf may be supported a ledger or other book $g$. It is highly desirable that the book may be held in a substantially horizontal plane—that is, the back thereof—and as the front edges are not always parallel with the back portion it becomes necessary to provide adjusting means for the platform. In order to accomplish this, the platform is pivoted, by means of a bolt $h$, to a nut portion $i$, (shown particularly in Figs. 11, and 13,) and the bottom portion of its part $d$ is made in the shape of a segmental worm-wheel $j$, engaging with an adjusting-screw $k$, having a hand-wheel $l$, as shown in Fig. 2. The arrangement is such that by turning the hand-wheel in one direction the table is tilted in one direction, while the rotation of the same in the other direction tilts the table in the opposite direction, so that any desired inclination or position may be obtained.

To accommodate books varying in width and thickness, it becomes necessary to provide means for raising and lowering the adjusting-platform. To accomplish this, the nut portion is provided engaging with a screw $m$, the upper portion of which is provided with a bevel-gear $n$, engaging with a similar bevel-gear $o$. The latter bevel-gear is provided with a shaft $p$, the outer end of which carries a hand-wheel $q$, so that by the rotation of this hand-wheel in one direction the screw is rotated and raises the nut portion, with its book-supporting table, while a rotation of the hand-wheel in the other direction operates to lower the nut portion, with its book-supporting table.

Figure 4:
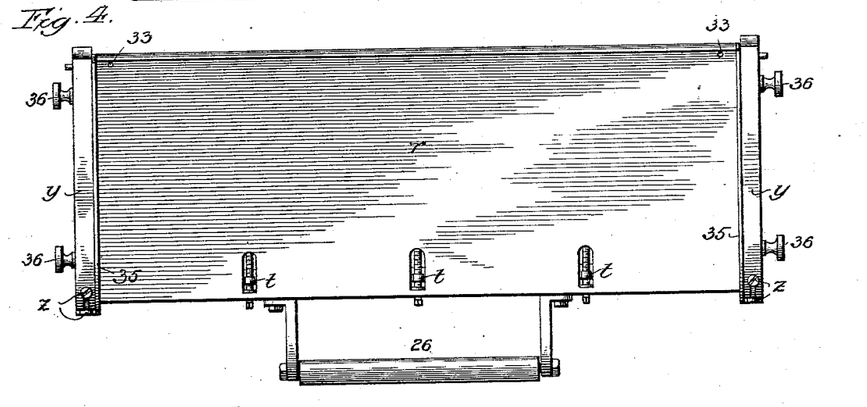
Fig. 4, a plan view of the form-supporting table.
Figure 5:
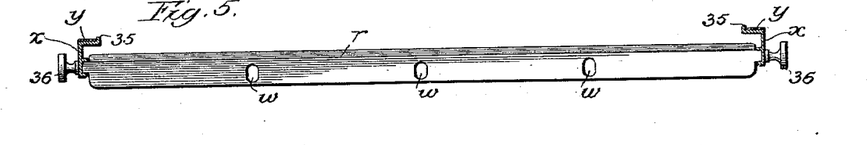
Fig. 5, a front elevation of the same with the end plates shown in section.
Figure 15:
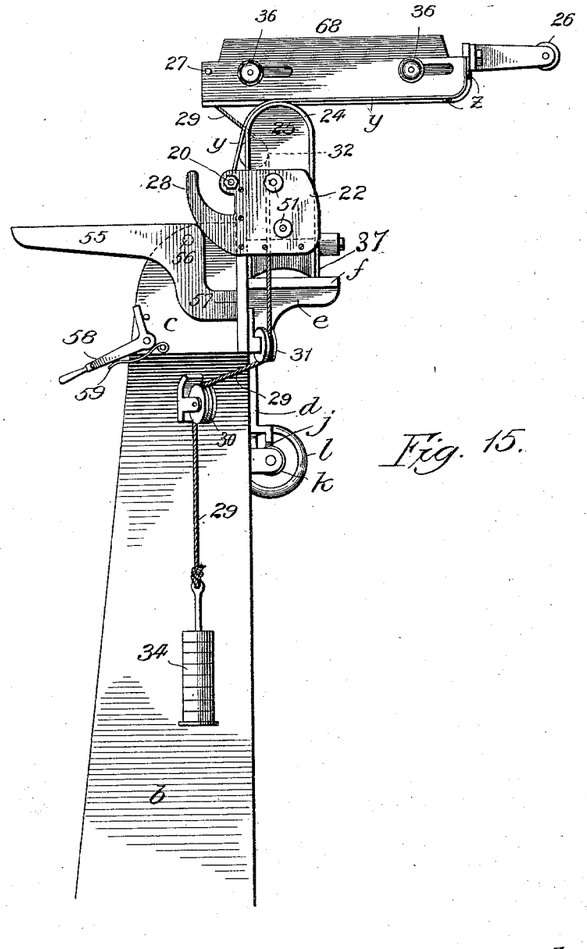
Fig. 15, a side elevation similar to Fig. 6, showing a book in position and the form-carrier in printing position.

To provide mechanism for printing the back of the book, a swinging form-holding platform or table $r$ is provided. (Shown particularly in Figs. 4, 5, and 11.) This platform, as shown particularly in the figures alluded to, carries a chase block or frame $s$, in which the type or other characters may be set, the inner and outer ends of which are beveled, so as to be engaged with an immovable hook on the rear of the form-supporting table and at the front end by means of adjustable hooks $t$. These adjustable hooks are moved inwardly and outwardly by means of a screw $u$, which has threaded engagement therewith, and are pivoted at $v$ and extend out through slotted openings $w$ in the front or flanged wall of the form-supporting table. By this arrangement it will be seen that as the screws are turned in one direction the hooked clamps are released and may swing down and out of the way of the chase-block and that they may be afterward brought up and retightened whenever desirable or necessary. During the printing operation it is desirable that some means be provided for guiding the form-supporting table across the back of the book to hold it out of contact therewith and permit the type to form the necessary impressions. To accomplish this result and permit the necessary movement of the form-carrying table to an inverted position in printing, the form-supporting table is provided with flexible guides or tracks composed of steel bands $y$, which we prefer to designate by the term "tracks," having their outer slotted ends adjustably engaged with the upper surfaces of the side brackets $x$ on the lateral edges of such table by means of the screws $z$, so that such ends swing with the form-table when it is moved into and out of printing position and their inner ends preferably looped and in engagement with two studs 20, which are mounted in the positions shown in Figs. 3 and 15. (See also Fig. 7.) It will thus be seen that these flexible tracks are only connected to the form-supporting tables at the outer ends of both such portions and being flexible are permitted to wind around the curved track-blocks, hereinafter described, guiding and bracing the form-table while in operation. Arranged opposite each end of the book and in grooves 21, formed by blocks 22 and 23, (see Figs. 3, 6, 7, and 8,) are two track-blocks 24, the upper curved surfaces 25 of which substantially coincide with the back of the book, being arranged substantially coincident therewith. The desired type characters being placed within the chase-block, the form-supporting table may be grasped by its handle 26 and brought upwardly, the studs 20 acting as a pivot for the same until its track portions contact the track-blocks, when it may be folded or swung around the same, bringing its type into inverted position and into contact with the back of the book and making the desired impressions. The sides of this form-supporting table are provided with two pins 27, arranged to contact the inner surface of two curved guides 28, which extend out from the block 22, and as such curved guides are concentric with the pins 20 the swinging motion of the form-supporting table is practically concentric with such pins 20 until its guide-pin 27 passes out of contact with such guiding-arm, so that it may then have a cycloidal motion, its edge swinging upward and away from the pins 20, as shown in Fig. 15. The opposite edge swings over the book with the swinging ends of the flexible tracks, such flexible tracks acting to hold the form-supporting table in the proper engagement with the track-blocks and forming flexible guides and tracks, the looped ends of which are in alinement with the pivotal center about which the form-table swings during at least part of its movements.

It is desirable to have some means by which the inner end (and what might be termed the "pivotal" end) of the form supporting table may be also pressed or held down under pressure in firm contact with the track-blocks. In order to accomplish this result, a pair of cable-cords 29 (or similar element) is provided and passed over idler-pulleys 30, 31, and 32 and secured to the inner upper surface of such table by being passed through the perforations 33 therein. (Shown in Fig. 4.) By this arrangement it will be seen that when the table is brought into contact with the track-blocks its upper surface becomes the lower one, as shown in Fig. 15, and its inner end is held downward by the action of the weights 34 on the cable or cord above described, thus insuring the desired amount of pressure for printing purposes. The brackets $x$ on the lateral edges of the form-table are flanged, as at 35, so as to act as a guide for the flexible tracks and also as a guide where they contact the outside of the track-blocks, and thus prevent accidental or longitudinal displacement of the parts. They are also adjustably engaged with the form-supporting table by means of the thumb-screw 36. (Shown particularly in Figs. 4 and 5.)

It is desirable to have some efficient means for clamping and holding the book in position during the operation of printing. To accomplish this result, I provide a movable clamp formed of a clamping-bar 37, (shown particularly in Fig. 3,) which is arranged to slide over the book-supporting plank or table $f$, as shown particularly in Fig. 2. Secured to each end of this clamping-bar is a cable or cord 38, which is brought inwardly and passed through the immovable clamping-plate 39, thence over and around idler-pulleys 40 and 41 and downwardly, where it is secured to the pivoted levers 42 and 43, which are secured to a common pivotal rod 44. One of these levers is provided with a treadle portion 45, extending out through the front of the machine and which the operator may contact with his foot to press downwardly, the contact resulting in the movable clamping-bar being forced against the tension of the springs 46 to contact the book, as shown in Fig. 2, and hold it in the desired position for efficient use.

Figures 6, 7, 8, 9, 10:
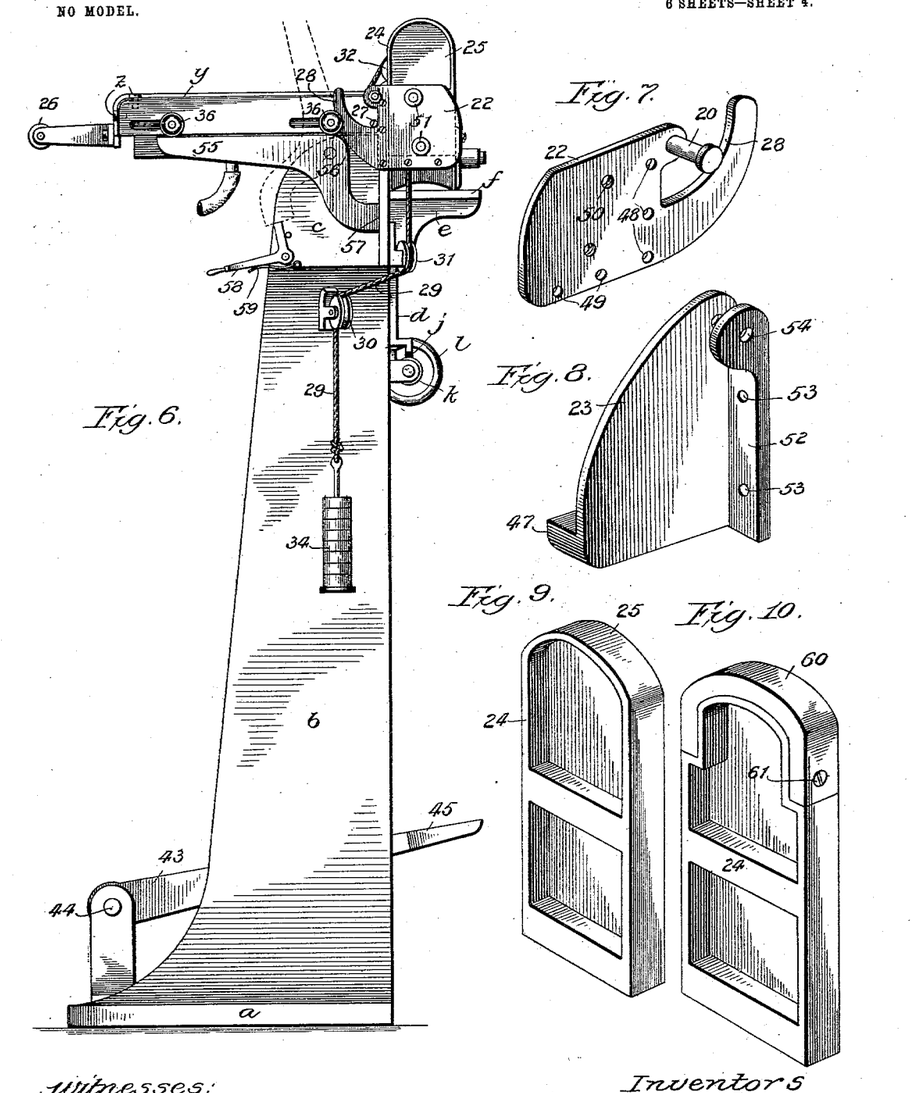
Fig. 6, a side elevation of the machine looking at it from the right of Fig. 1 and the left of Fig. 2.
Fig. 7, an enlarged perspective view of the combined form-table guide and portion of the track-block holder.
Fig. 8, a perspective view of a portion of a track-holder.
Fig. 9, a perspective view of one of the track-blocks.
Fig. 10, a similar view of a modified form of or cushioned track-block.

It is desirable to provide means for removably holding the track-blocks in position. To accomplish this result, the plates 22 and 23, above alluded to, are provided, one of which is secured to the outside of the machine, as shown in Figs. 3 and 6, at each side of the same, the inner side of one being provided with a lower inwardly-extending base portion 47, which provides for the proper space or channel hereinafter described. The plate or block 22 is provided with several holes 48, through which screws are passed for securing it to the flange of the main frame, and with several perforations 49, through which screws are passed to secure it to the inwardly-extending flange 47 of the plate or block 23, and with perforations through which set-screws 51 are provided to hold the removable track-blocks in position—that is, to force it against the opposite wall or inner surface of the plate 23. This plate is provided with an outwardly-extending flange 52, provided with several perforations 54, through which screws are passed to secure it to the main frame of the machine, thus effectually holding the parts in position. This extending flange and the main wall of the plate 23 are perforated, as shown at 54, through which the axes of the shafts of the idler-pulleys are passed, forming the bearings for the journals thereof.

The operator in using the machine generally stands in front of it—that is, to the right of Fig. 6—where he may have control of the book and ready access of the treadle, and in the printing operation he has to reach clear over the machine to grasp the handle thereof. In the printing of large books this would prove an annoying operation. It becomes desirable, therefore, to provide means by which the supporting-table may be arranged at an incline or adjacent to the book and held in such position. To accomplish this, the brackets 55, which support the form-supporting table, are pivoted at 56, so that the inner ends 57 may contact the main frame of the machine and be held efficiently in horizontal position. When it is desirable to arrange the table in a position more accessible to the operator, these brackets may be swung into the position shown in dotted lines in Fig. 6, so that the ends may contact a yielding lever 58 and hold the parts up in easy position for the operator to grasp the same. When it is desirable for the parts to resume their normal position, this yielding lever may be pressed down against the tension of its spring 59 and permit the parts to drop down into the position shown in full lines in Fig. 6.

It is well known that in books of different thicknesses the backs thereof will have different curvatures. In order to provide a proper track-block therefor having the proper curvature, the block may be made as shown in Fig. 10, one part of which will always be in position to be grasped by the set-screws 51 in the channel 21. The upper part forms the track 60 and may be removably secured thereto by means of the screw 61. It will thus be seen that by this arrangement any desired width or curvature of track may be used as necessity may require or circumstances demand. This track 60 may also be made of a cushioning substance, such as rubber, and removably or adjustably secured thereto, which will permit the taking up or compensating for inequalities in the curvature of the book, all of which will be understood and appreciated by those skilled in the art.

To assist the operator in placing the book in position, we provide an adjusting rod or gage 62, which has a downwardly-extending rigid end 63, notched so as to span the flanged wall of the curved surface 25 of the track-block. (Shown in Fig. 9.) This adjustable gage has gage-blocks 64 and 65 thereon, adjustably secured thereto and at equidistant points from the transverse center. The free end of the adjustable gage is provided with a yielding or movable block 66, between which and the head of such block is a tension-spring 67. This yielding block is also notched, so that it may be pressed downwardly and brought into proper engagement with the flanged track-block. The operator may then position the book centrally by moving the hand-wheels $l$ and $q$, one of which brings it into the desired horizontal plane and the other of which raises or lowers it, as may be required, in order to bring it into proper conformation with the type-form, all of which will be appreciated by those skilled in the art.

It is desirable that some means be provided for heating the type, and to accomplish this result a set of steam or gas heating pipes 67 (see Fig. 11) is provided and connected with a source of steam or gas supply. These heating-pipes are inclosed in a chamber on the under side of the form-table formed by a closing-cap 68 and which confines the heated air as desired.

We claim—

1. In a machine for printing the backs of books, the combination of a book-holding platform, means for clamping the book thereon, a swinging form-table to carry type of the desired character, and a flexible track for guiding such form-table around and over the back of the book to bring the face of the type in contact therewith, substantially as described.

2. In a machine for printing the backs of books, the combination of an adjustable book-holding platform, means for clamping the book thereon, a swinging form-table for bearing type of the desired character, and curved track-blocks of substantially the same contour as the back of the book to assist in guiding the form-table across and over the back of the book, substantially as described.

3. In a machine for printing the backs of books, the combination of a book-holding platform, means for holding a book thereon, a swinging form-table for bearing type of the desired characters, track-blocks of the same contour as the back of the book to assist in guiding the form-table across and over the back of the book, and flexible track mechanism connected with the form-table and with the main part of the machine and adapted to be wound around the guiding-surface of the track-blocks while the form-table is in operation, substantially as described.

4. In a machine for printing the backs of books, the combination of a book-holding platform, means for clamping the book thereon, a swinging form-table for bearing type of the desired character, track-blocks of the same contour arranged at each end of the book to assist in guiding the form-table in operation, flexible tracks connected with the form-table and the main part of the machine and adapted to be wound around the guiding-surface of the track-blocks when the form-table is in operation, and means for keeping the form-table under pressure on the track-blocks, substantially as described.

5. In a machine for printing the backs of books, the combination of a book-holding platform, means for holding a book thereon, a swinging form-table for bearing type of the desired character, track-blocks of the same contour as the back of the book arranged adjacent to each end thereof to assist in guiding the form-table, flexible tracks connected with the outer lateral edges of the form-table passed over the upper surfaces thereof and connected with the main part of the machine and arranged to be wound and unwound on the guiding-surfaces of the track-blocks during the operation of the table, and a weighted cord or similar mechanism connected to the inner edge of the form-table for holding such table under pressure on the track-blocks during the printing operation, substantially as described.

6. In a machine for printing the backs of books, the combination of a book-holding platform, means for adjusting it vertically, means for tilting it, means for holding a book thereon, a swinging form-table for bearing type of the desired character, track-blocks of the same contour as the back of the books to assist in guiding the form-table, flexible tracks connected with the form-table and arranged to be wound and unwound on the guiding-surface of the track-blocks during the printing operation, and mechanism connected with the inner edge of the form-table for holding such form-table under pressure while it is being passed over the track-blocks, substantially as described.

7. In a machine for printing the backs of books, the combination of a book-holding platform, means for moving such platform upwardly and downwardly, means for tilting such platform, clamping mechanism for holding the book in contact with such supporting-platform, treadle mechanism connected with the clamping mechanism for operating the same, a form-table for swinging type characters into and out of contact with the back of the book, and means for guiding such form-table across and over the back of the book, substantially as described.

8. In a machine for printing the backs of books, the combination of an adjustable book-holding platform, means for clamping the book thereon, a swinging form-table for bearing type of the desired character into and out of contact with the back of the book, removable track-blocks of the same contour as the back of the book arranged adjacent to each end thereof to assist in guiding the form-table, flexible band-tracks connected with the outer edges of the form-table and with the main part of the machine and arranged to be wound and unwound on the guiding-surfaces of the track-blocks during the printing operation, means for keeping such form-table under pressure during its contact with the track-blocks, and supplementary guiding mechanism comprising pin and curved bracket to assist in guiding the form-table at the beginning of its swinging movement, substantially as described.

9. In a machine for printing the backs of books, the combination of an adjustable book-holding platform, means for clamping a book thereon, a swinging table provided with a form for bearing type of the desired character into and out of contact with the back of the book, track-blocks of the same contour as the back of the book between which such book may be arranged to assist in guiding the form-table, flexible band-tracks connected with the outer edges of the form-table and with the main part of the machine and arranged to be wound and unwound on the guiding-surfaces of the track-blocks during the swinging movements of the form-table, a pin on such form-table, and a curved guiding-arm on the main part of the machine forming supplementary guiding mechanism for keeping the form-table on a pivot coincident with the connection of its band-tracks with the main part of the machine until such form-table is brought into contact with the track-blocks, substantially as described.

10. In a machine for printing the backs of books, the combination of an adjustable book-holding platform, means for clamping a book thereon, a swinging table provided with a form for bearing type of the desired character into and out of contact with the back of the book removable track-blocks arranged adjacent to each end of the book, flexible band-tracks connected with the outer edges of the form-table and with the main part of the machine arranged to be wound and unwound on the guiding-surface of the track-blocks during the swinging movement of the form-table, weighted mechanism for keeping such form-table under pressure during its contact with the track-blocks, and a heater arranged on the back of the form-table, substantially as described.

11. In a machine for printing the backs of books, the combination of a pivoted book-holding platform, screw mechanism for raising and lowering such platform, screw mechanism for tilting such platform, a movable clamp on such platform for holding the book in engagement therewith, treadle mechanism connected with such book-clamp for operating the same, a swinging form-table for bearing type of the desired character into and out of contact with the back of the book, track-blocks arranged adjacent to each end of the book, flexible band-tracks connected with the outer edges of the form-table and with the main part of the machine arranged to be wound and unwound on the guiding-surfaces of the track-blocks during the printing operation, and weighted cord mechanism connected with the inner edge of the form-table to assist in keeping it under pressure during its printing operation, substantially as described.

12. In a machine for printing the backs of books, the combination of a pivoted book-holding platform, screw mechanism for tilting such platform, screw mechanism for raising and lowering such platform, a clamp arranged adjacent to such platform for holding the book in position, treadle mechanism provided with cords connected with such book-clamp for operating the same, a swinging form-table for bearing type characters into and out of contact with the back of the book, removable track-blocks arranged adjacent to each end of the book, flexible band-tracks connected with the outer lateral edges of the form-table and passed over the upper surface of the same and connected with the main part of the machine arranged to be wound and unwound on the guiding-surfaces of the track-block during the printing operation, weighted cord mechanism for keeping the swinging form-table under pressure to assist in the printing operation, supplementary guiding mechanism composed of pins connected with the form-table and curved arms connected with the main part of the machine concentric with the point at which the band-tracks are connected with the machine for guiding the form-table during the beginning of the swinging operations, and a heater arranged on the back of such form-table, substantially as described.

13. In a machine for printing the backs of books, means for holding the book in position, a swinging form-plate for bearing type characters, and track-blocks provided with yielding or cushioned surfaces of substantially the same contour as the back of the book to assist in guiding the form-blocks into and out of contact with the back of the book during the printing operation, substantially as described.

WILLIAM P. NORTHCOTT.
ELLSWORTH E. FLORA.

Witnesses:
THOMAS F. SHERIDAN,
HARRY IRWIN CROMER.